July 23, 1963 E. I. LYNCH ET AL 3,098,896

CATHODE RAY TUBE SYSTEM USING INDEXING SIGNALS

Filed Aug. 1, 1960 2 Sheets-Sheet 1

INVENTORS:
EDWARD I. LYNCH,
THOMAS T. TRUE,

BY Joseph Levinson
THEIR ATTORNEY.

INVENTORS:
EDWARD I. LYNCH,
THOMAS T. TRUE,
BY Joseph Levinson
THEIR ATTORNEY.

3,098,896

CATHODE RAY TUBE SYSTEM USING INDEXING SIGNALS

Edward I. Lynch, Syracuse, and Thomas T. True, Camillus, N.Y., assignors to General Electric Company, a corporation of New York Filed Aug. 1, 1960, Ser. No. 46,670
9 Claims. (Cl. 178—5.4)

This invention relates to cathode ray tube systems in which an indexing signal is applied to correlate modulation of the electron beam with the position of impingement of the beam on the tube face and, more particularly, to an improved system and tube structure for the generation of the indexing signal.

The art is familiar with proposed color television image representation systems in which a plurality of laterally displaced triads are imprinted on the tube face. Each triad consists of three vertical phosphor stripes producing light of a different primary color in response to electron beam impingement thereon.

As the beam is swept horizontally across the vertical triads, the writing beam is modulated in accordance with color content of the video information to generate an image in color on the tube screen. For proper color rendition, the beam must be modulated in accordance with the content of each primary color at that time when the beam is impinging upon the phosphor stripe of the corresponding color. The non-linearities inherent in the sweep rate and irregularities in the position of printing of the color triads on the screen of the picture tube make necessary a system for correlating the impingement position of the beam and the beam modulation throughout the entire scanning raster.

The indexing signal may be generated as the secondary emission current in auxiliary stripes behind the color phosphors, as the current in conducting combs positioned to intercept the writing beam or an auxiliary indexing beam, as ultraviolet radiation from appropriate auxiliary phosphor stripes in back of the color stripes, etc.

The phase information contained in the derived index signal may then be employed to control the time of application of the video modulation of the beam to ensure correspondence between the color content of the beam modulation and the position of impingement of the beam.

In the systems proposed by the art, obtaining of a usable index signal has been difficult to execute. If the writing beam is employed for the generation of the index signal, it has been found that the video modulation of the writing beam contaminates the index signal, impairing the accuracy of the phase informaiton in the index signal.

When an auxiliary beam is employed to generate an index signal in, for example, a conducting comb, the teeth of which are superimposed on the phosphor stripes, the auxiliary beam may be independently modulated to serve as a means for separation of the modulated index signal from the index signal carrying spurious modulation caused by the writing beam. However, to obtain an index signal of desired high amplitudes from the auxiliary beam, the beam current must be maintained at a reasonably high level. Similarly, when the writing beam is used alone, the minimum beam current is maintained at a predetermined amplitude. Unfortunately, this results in an overall haze limiting the contrast ratio of the image. When the indexing beam current is maintained at a low level, increased circuit complexity and an increase in the time lag between generation of the index signal and utilization thereof results.

It is, therefore, the primary object of this invention to provide an improved system for the generation of an indexing signal.

It is a further object of this invention to provide an improved cathode ray structure for index signal generation.

In accordance with these objects there is provided, in a preferred embodiment of this invention, a cathode ray tube having a plurality of vertical phosphor stripes on the tube face thereof. The stripes are separated by guard bands of non-conducting, non-light emitting material. The phosphor stripes are arranged in repeating triads of three phosphor stripes, each of which produces a different primary color in response to electron beam impingement. Means responsive to impingement by an electron beam are superimposed on at least one guard band per triad to generate an index signal.

Means are provided to generate an index or pilot beam and a writing beam, and to deflect such beams through a scanning raster simultaneously.

Means are provided to modulate the index beam so that the beam current is at a maximum when the beam impinges upon the guard band and at a minimum when the beam impinges upon the phosphor stripes.

The indexing signal is used to correlate the modulation of the writing beam with the position of beam impingement in conventional fashion. Since the index signal is used at the triad rate, only one index generating means, such as a tooth of a conductive comb, is necessary per triad. The modulation of the beam will, however, be at three times the index signal frequency. Thus, a frequency tripler is employed in such embodiment for index beam modulation.

In another embodiment, the index signal generating means, such as the teeth of a conductive comb, is superimposed on each guard band. To provide the index signal at the triad rate, the frequency must be divided by a factor of three. In such embodiment, a one per triad index signal generating means is preferably employed before the beam reaches the image area to prevent phase ambiguity during line scan.

In either embodiment, the indexing beam current is maintained high during generation of the index current. Thus, high amplitudes of index signals are possible. The indexing beam current is at a minimum or even zero during impingement on the phosphors and thus no haze is generated to degrade image contrast ratios.

This invention may be more clearly understood by reference to the following description taken in combination with the accompanying drawings, of which:

Figure 1:
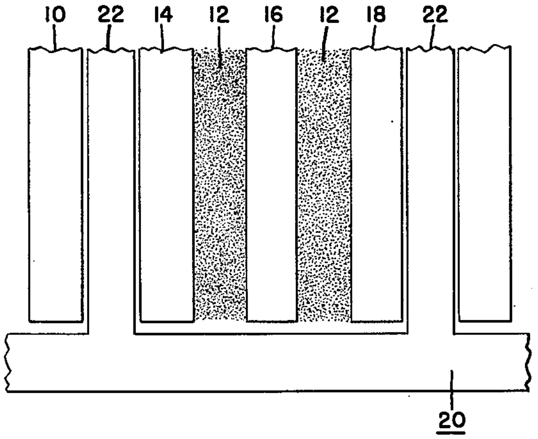
FIGURE 1 is a fragmentary plan view of a tube face of a cathode ray tube constructed in accordance with this invention.

In FIGURE 1 there is shown a portion of the tube face of a cathode ray tube to enlarged scale for ease of understanding. Applied to the tube face is a plurality of vertical phosphor stripes indicated as 10, 14, 16, and 18. Each of the phosphor stripes consists of luminescent material to generate light of a specific primary color in response to excitation by an impinging beam of electrons.

Each stripe is separated by a guard band 12 composed of black non-conductive, non-light reflecting material. The phosphor stripes are arranged in repeating triads of three phosphors 14, 16 and 18, each of which produces light of a different primary color, such as green, blue and red respectively. The guard band serves, in addition to functions which will be pointed out hereinafter, to prevent color degradation on spot blooming.

The indexing structure 20 is positioned over the guard band separating the triads. The indexing structure may, for example, comprise a conductive comb, each tooth 22 of which is positioned over the guard band separating the triads. It will be noted that the comb structure could be fabricated from conducting material to generate an indexing current directly from the electron impinging thereon, or a material for generation of a secondary emission current in the comb or a material to generate an ultraviolet radiation to modulate an ultraviolet sensitive pick up device.

The imprinting of the phosphor stripes in the separating guard bands can be done in conventional fashion. The screen structure may then be completely aluminized. A layer of insulating material could then be applied to the aluminum coat. The comb material could then be imprinted and the insulating material which is not covered by the comb could be washed away. Alternatively, the phosphor areas could be aluminized. The comb structure could then be applied directly to the guard band material. Although this latter technique requires somewhat greater care to insulate the comb from the aluminized phosphor, it has the advantage of providing a comb structure with lower comb-anode electrical capacitance.

Figure 2:
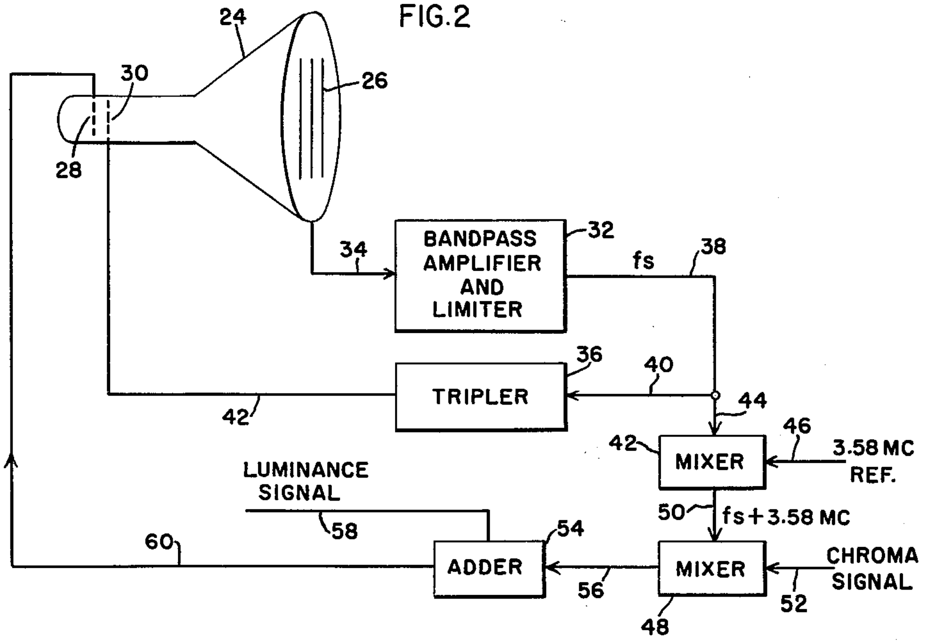
FIGURE 2 is a schematic diagram of a cathode ray tube system in accordance with the present invention.

This system for generation and utilization of the index signal may be more clearly understood by reference to FIGURE 2.

In FIGURE 2 there is shown cathode ray tube 24 carrying the color triads represented by lines 26 on the face thereof.

The tube is provided with an electron gun to generate an electron beam which is deflected over the face of the tube in a scanning raster by conventional deflection yokes. A grid 28 is applied to modulate the beam with the video information and an index grid 30 is provided to modulate the index beam. The index beam is, in this embodiment, a beam generated by an auxiliary electron gun deflected synchronously with the main writing beam in the scanning raster.

The current developed in the index comb generates a sinusoidal index signal across a tank circuit or other impedance circuit placed between the comb structure and the anode voltage source in conventional fashion. This signal will have a frequency determined by the repetition rate of the triads and the horizontal scanning velocity of the index beam. The signal at a frequency $f_s$ is applied to a bandpass amplifier and limiter 32 over lead 34. After amplification and limiting, the index signal is applied to a frequency tripler circuit 36 over leads 38 and 40. The resultant index signal, at $3f_s$, is applied to the index grid 30 over lead 42.

The modulation of the index grid in accordance with the instantaneous frequency of the indexing signal eliminates impingement of the index beam on the phosphors. That is, when the index beam impinges a tooth of the comb, the amplitude is at a maximum. As the beam moves to the adjacent phosphor, the beam is decreased to a minimum. Since the modulation occurs at three times the frequency of the generated index signal, the index beam is a maximum over each of the guard bands including the guard band having the superimposed comb tooth and is at a minimum over each conductive phosphor.

The phase shift throughout the loop is adjusted initially so that the peaks of the index beam current will occur when the beam is striking the guard band areas. Thereafter, the modulation of the beam will follow the instantaneous frequency determined by the actual position of beam on the tube face. By proper biasing, the index beam current can be zero at the time when it is impinging on the phosphors.

It will be noted that the feedback loop is self-starting. At the start of the scan, the index beam is at a steady value determined by the bias on the tube. As it sweeps it generates the indexing signal at the $f_s$ frequency. The index signal, is a positive feedback, at $3f_s$ to modulate the index beam current. It will be noted that good limiting is necessary to prevent amplitude "squegging" of the loop. However, in applications where this becomes a problem, the limiter circuit could be replaced by a phase or frequency control oscillator.

The signal control loop is conventional in that the index signal is heterodyned with the 3.5 mc. reference carrier regenerated from the NTSC signal in mixer 42 to which the index signal is applied over lead 44 and to which the reference is applied over lead 46. The sum component of the heterodyned output is then mixed with the chroma signal in mixer 48 to which it is applied over lead 50 and to which the chroma signal is applied over lead 52. The difference component, which is a dot-sequential chrominance signal at triad rate frequency, is applied to adder 54 over lead 56 for linear addition thereto of the luminance signal applied to the adder over lead 58. The composite signal now containing the luminance signal and the dot-sequential chrominance signal is applied to the writing grid 28 over lead 60. Beam position phase information is included in the dot-sequential chrominance signal.

It can be seen that an index signal generated in accordance with the present invention uses the modulation thereof to eliminate background haze. Thus, improved contrast ratios in the image representation may be had. The index beam pulsing will produce a high output index signal. Thus, the control loop need not amplify the signal as much as in systems proposed by the prior art. The high index signal level will also allow the use of wider bandwidths in the control loop to speed up the correction for errors, thus reducing the tolerances placed on sweep linearity and sweep width. The tube face can be printed from a single master since change of pitch of the index generating comb is not required as is found in some of the systems proposed by the prior art. The index stripes need not be closely regulated in thickness since the impinging beam does not have to penetrate the index stripe to reach the light producing area. Of course, no phase ambiguity exists and thus loss of indexing information (as for example by a blemish on the tube face) will only cause momentary color errors.

The system has been described particularly with the use of a pilot beam generated by an auxiliary gun. A single gun could be employed and the beam deflected from the writing grid to the index grid at a $3f_s$ frequency. Also, time sharing could be used with a single gun having a single modulation grid. Grid modulation will produce the dot rate writing signal when the beam is on the phosphors and a pulse index signal when the beam is hitting the guard bands. Either of the alternative systems retains the advantage that the index signal generation is separated from the presentation of information on the tube face.

At the usual sweep rate and with feasible spacing between phosphor stripes, the indexing signal frequency would work out to be 6.4 mc./sec. This frequency is up from the video frequencies by only a factor of two and, in some applications, crosstalk between video and index signal generation with resultant phase error may result. In such applications, the embodiment shown in FIGURES 3 and 4 may advantageously be employed.

Figure 3:
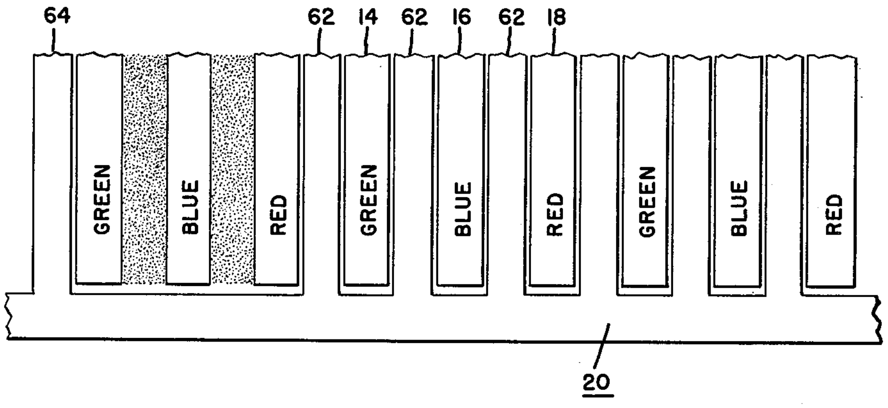
FIGURE 3 is a fragmentary plan view of a tube face in accordance with another embodiment of this invention.

In FIGURE 3 there is shown to enlarged scale the tube face having color stripes of the primary colors, such as green, blue, red, 14, 16 and 18 respectively. However, the comb 20 is applied with a tooth 62 over each guard band in the main portion of the tube face. At the extreme edge of the tube, the comb is continued with tooth spacing of one per triad as illustrated by tooth 64. The color phosphors may be omitted at the edge, since, as will become clear in subsequent portions of the specification, the edge of the tube is used merely to prevent phase ambiguity.

Figure 4:
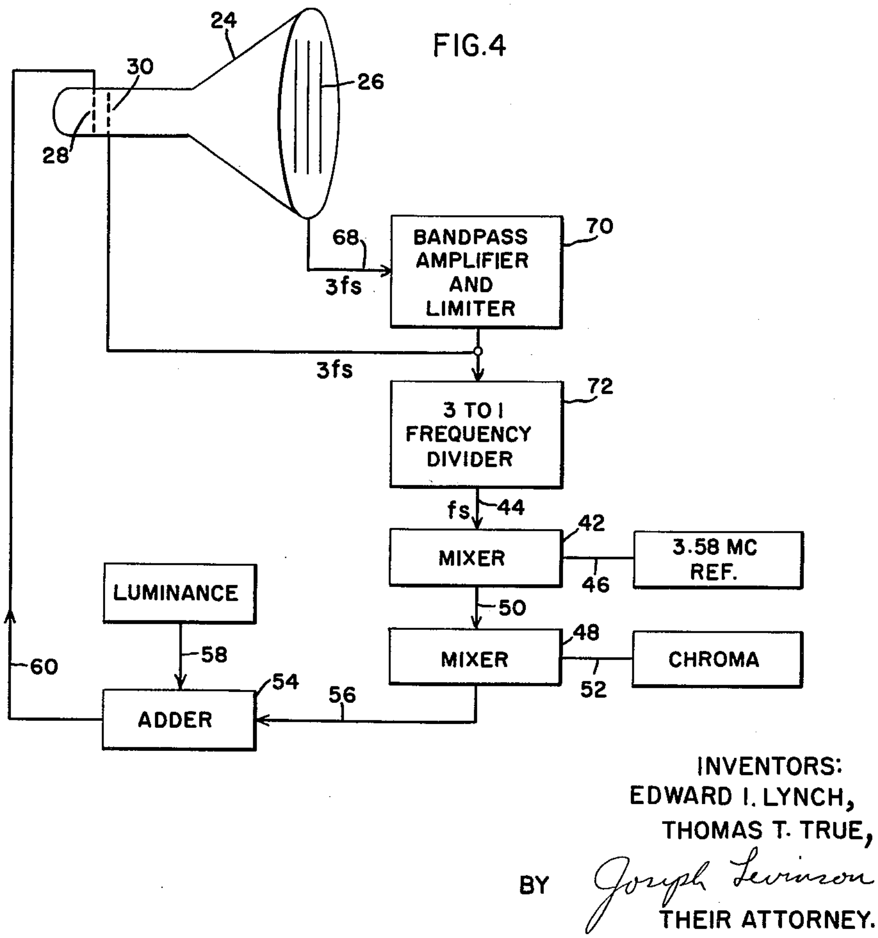
FIGURE 4 is a schematic diagram of a cathode ray tube system in accordance with another embodiment of this invention.

In FIGURE 4 there is shown a system incorporating the tube shown in FIGURE 3. The embodiment shown in FIGURE 4 is similar to that shown in FIGURE 2 and the same reference numerals are applied to like components.

Referring now to FIGURES 3 and 4, it can be seen that as the index beam is swept across the triads 26 on the tube face, an index signal will be generated at three times the frequency, $f_s$, of the index signal generated by the embodiment shown in FIGURE 2. The index signal is applied over lead 68 to the amplifier and limiter circuit 70. After processing, the index signal is applied to the index grid 30 to modulate the index beam. By providing proper phase delay through the loop, the modulation of the index beam will provide maximum index beam current when the beam impinges the comb teeth and minimum (zero by proper biasing) beam current during impingement on the phosphors.

The index signal is used to control the video modulation at the triad rate. Thus, the frequency of the index signal is brought down to triad rate by divider 72, which is a 3 to 1 frequency divider. The system for use of the index signal phase information is then identical with that of FIGURE 2.

It will be noted that if the comb teeth were interspersed between each color phosphor, phase ambiguity might exist. To prevent phase ambiguity, it has been found convenient to provide a portion at the edge of the tube for phase locking. In this portion, the comb teeth are at a one per triad rate to allow proper correlation before starting the three per triad indexing stripes. Alternatively, phase ambiguity at the start of a line could be prevented by ensuring a fixed phase relationship between the first indexing tooth and a stripe of a given color.

It will be noted that, in addition to higher frequency separation between video frequencies and index signal frequencies, the embodiment of FIGURE 4 provides increased indexing signal output by a factor of three.

This invention may be variously modified and embodied within the scope of the subjoined claims.

What is claimed is:

1. A cathode ray tube system comprising: a cathode ray tube having a plurality of vertical phosphor stripes positioned on a face of the tube; each of said stripes having a same width; a guard band separating each stripe from an adjacent one of said stripes, each of the guard bands having the same width; electron gun for generating an index beam; means for periodically sweeping the index beam across the tube face in a scanning raster; means associated with said guard bands for generating an index signal responsive to an impingement of said index beam; and means for modulating said index beam in a manner for providing that the beam current attains an instantaneous peak value when the beam impinges each of the guard bands.

2. A system in accordance with claim 1 in which said indexing signal generating means comprises a comb having a tooth superimposed on each of said guard bands.

3. A system in accordance with claim 1 in which said indexing signal generating means comprises a comb having a tooth superimposed on the guard band between each triad of stripes.

4. A system in accordance with claim 2 in which said index beam modulating means includes a positive feedback loop to modulate the index beam at the frequency of the index signal.

5. A system in accordance with claim 4 which includes means for limiting the amplitude of the modulation signal.

6. A cathode ray tube system comprising: a cathode ray tube having a plurality of vertical phosphor stripes positioned on a face of the tube; a guard band separating each stripe from an adjacent one of said stripes; each of said stripes having a same width; each of said guard bands having a same width; an electron gun for said tube for generating an index beam; an electrode for said tube for controlling the intensity of said index beam; means for periodically sweeping the index beam across the tube face in a scanning raster; means for generating an index signal responsive to impingement of the beam including an index comb having a tooth superimposed on each guard band; means for amplifying and coupling said generated index signal to said beam intensity control electrode; a source of chroma intelligence; and a servo circuit arrangement responsive to said index signal for automatically providing correspondence in time between the occurrence of chroma intelligence and the impingement of an electron beam on a corresponding color stripe; said servo circuit arrangement including means for dividing the frequency of said amplified index signal by a factor of three.

7. A cathode ray tube system comprising: a cathode ray tube having a plurality of vertical phosphor stripes positioned on a face of the tube; a guard band separating each stripe from an adjacent one of said stripes; each of said stripes having a same width; each of said guard bands having a same width; an electron gun for said tube for generating an index beam; an electrode for said tube for controlling the intensity of asid index beam; means for periodically sweeping the index beam across the tube face in a scanning raster; means for generating an index signal responsive to impingement of the beam including an index comb having a tooth superimposed on a guard band between each triad of stripes; means for amplifying said index signal, for tripling the frequency of said index signal, and for coupling said index signal to said beam intensity control electrode; a source of chroma intelligence; and a servo circuit arrangement responsive to said index signal for automatically providing correspondence in time between the occurrence of chroma intelligence and the impingement of an electron beam on a corresponding color stripe.

8. A cathode ray tube system comprising: a cathode ray tube having a plurality of vertical color phosphor stripes positioned on a face of the tube; each of said stripes having a same width; a guard band separating each stripe from an immediately adjacent one of said stripes; each of said guard bands having a same width; an electron gun for generating an index beam; an electrode for controlling the intensity of said index beam; means for periodically sweeping the index beam across the tube face in a scanning raster; means including a comb of conductive material having a tooth superimposed on a guard band between a triad of stripes for generating an index signal responsive to impingement of the beam on said tooth: and a positive feedback circuit loop including frequency tripling circuit means coupled between said index signal generating means and said electrode for tripling the generated index signal frequency and intensity modulating said index beam at three times the frequency of the index signal.

9. A system in accordance with claim 8 wherein said feedback loop includes means for limiting the amplitude of the modulation signal.

References Cited in the file of this patent

UNITED STATES PATENTS

| | | |
|---|---|---|
| 2,689,269 | Bradley | Sept. 14, 1954 |
| 2,768,318 | Bradley et al. | Oct. 23, 1956 |
| 2,945,087 | Graham et al. | July 12, 1960 |
| 2,979,559 | Burgett et al. | Apr. 11, 1961 |